US007090729B2

(12) United States Patent
Oohama et al.

(10) Patent No.: US 7,090,729 B2
(45) Date of Patent: Aug. 15, 2006

(54) OUTER RING MEMBER FOR CONSTANT VELOCITY JOINT AND METHOD OF MANUFACTURING THE MEMBER

(75) Inventors: Tsukashi Oohama, Utsunomiya (JP); Naomi Sato, Tochigi-ken (JP); Yoshihisa Doi, Utsunomiya (JP); Saburo Akimoto, Tochigi-ken (JP); Shigeo Ota, Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 246 days.

(21) Appl. No.: 10/344,343

(22) PCT Filed: Jun. 27, 2002

(86) PCT No.: PCT/JP02/06482

§ 371 (c)(1),
(2), (4) Date: Feb. 11, 2003

(87) PCT Pub. No.: WO03/002284

PCT Pub. Date: Jan. 9, 2003

(65) Prior Publication Data

US 2003/0168126 A1    Sep. 11, 2003

(30) Foreign Application Priority Data

Jun. 28, 2001  (JP)  ............................. 2001-197281

(51) Int. Cl.
  *C21D 7/02*  (2006.01)
  *C21D 9/40*  (2006.01)
(52) U.S. Cl. ...................... 148/246; 148/287; 148/589; 148/649

(58) Field of Classification Search ................ 148/246, 148/287, 589, 648, 649
See application file for complete search history.

(56) References Cited

U.S. PATENT DOCUMENTS 3,644,973 A * 2/1972 Abe ...................... 29/898.052
5,007,266 A * 4/1991 Nishiuchi et al. ............... 72/44
5,803,993 A * 9/1998 Yoshida et al. ............. 148/320

FOREIGN PATENT DOCUMENTS

| JP | 56-23337 A    | 3/1981 |
| JP | 2-211925 A    | 8/1990 |
| JP | 2-217129 A    | 8/1990 |
| JP | 9-220633 A    | 8/1997 |
| JP | 2000-61576 A  | 2/2000 |
| JP | 2000-117385 A | 4/2000 |

* cited by examiner

*Primary Examiner*—George Wyszomierski
(74) *Attorney, Agent, or Firm*—Birch, Stewart, Kolasch & Birch, LLP

(57) ABSTRACT

An outer ring member for a constant velocity joint is manufactured. An intermediate preformed product having a cup section with an incomplete shape is formed by pressing a large diameter section without applying a low temperature annealing treatment and a lubricating chemical conversion coating treatment. Then, applying a low temperature annealing treatment and a lubricating chemical conversion coating treatment to the intermediate preformed product, thereafter a formed product having a cup section provided with ball-rolling grooves is formed by backward extrusion to the intermediate preformed product. Subsequently, the product is ironed before hardening, without applying a low temperature annealing treatment and a lubricating chemical conversion coating treatment to the formed product.

2 Claims, 13 Drawing Sheets

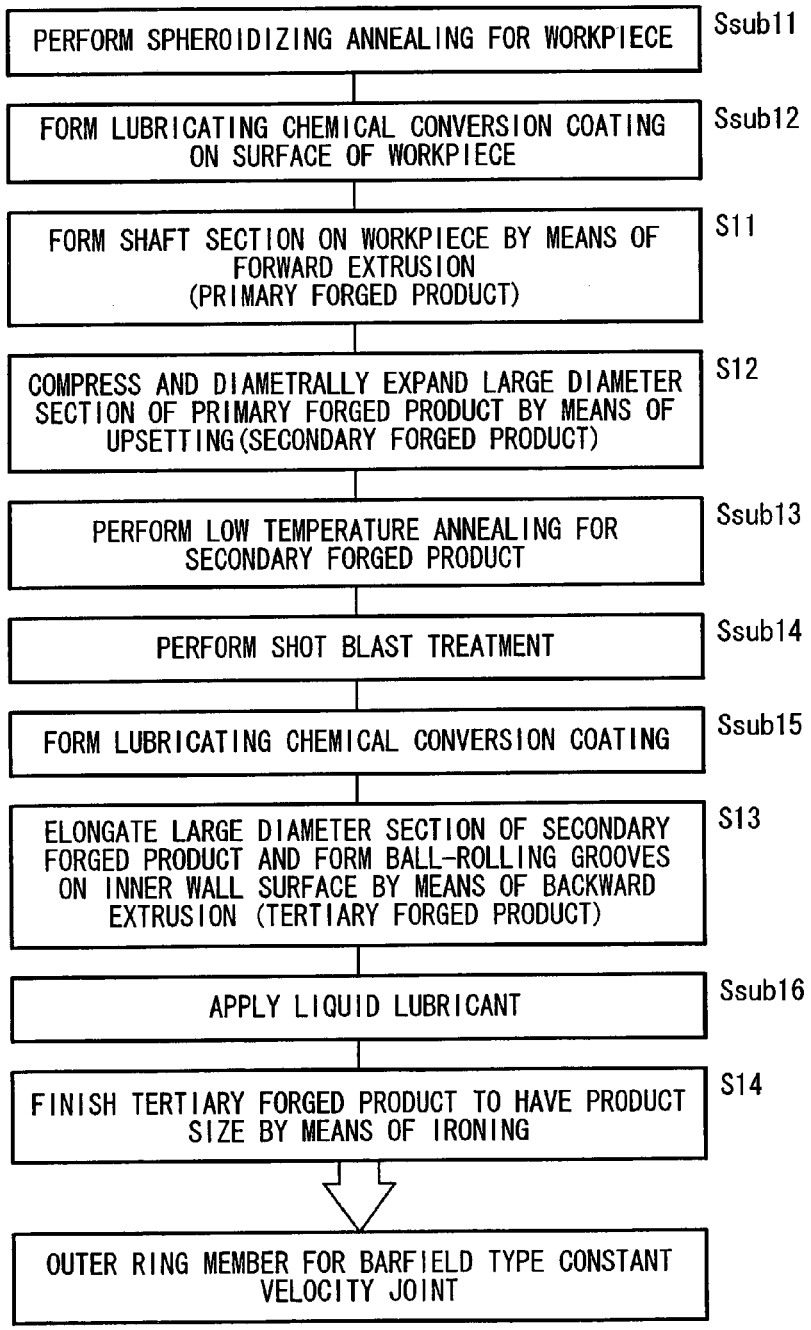

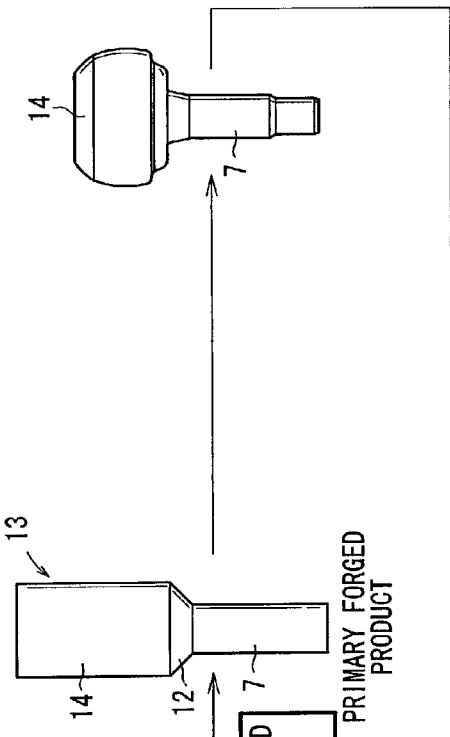
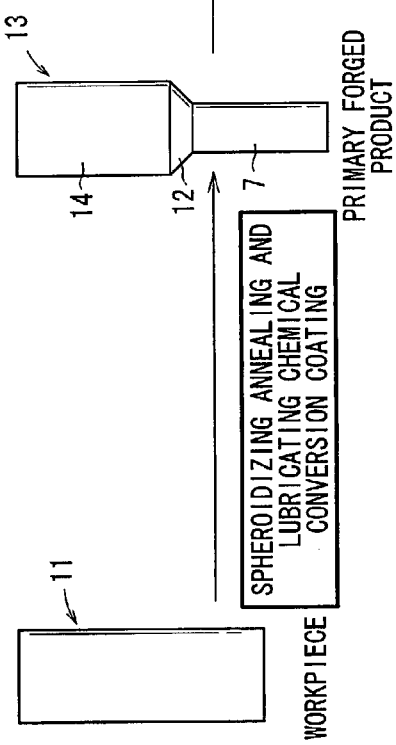
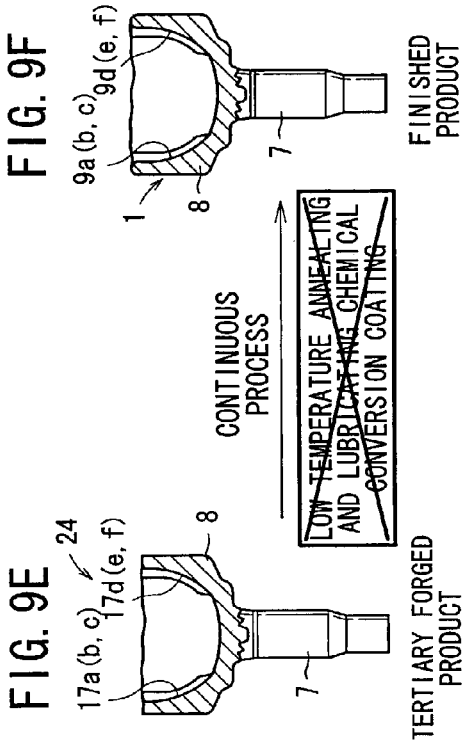

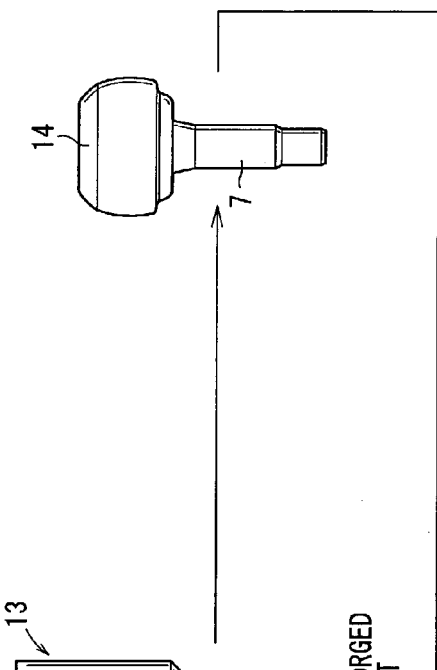
FIG. 13A WORKPIECE
FIG. 13B PRIMARY FORGED PRODUCT
FIG. 13C
SPHEROIDIZING ANNEALING AND LUBRICATING CHEMICAL CONVERSION COATING
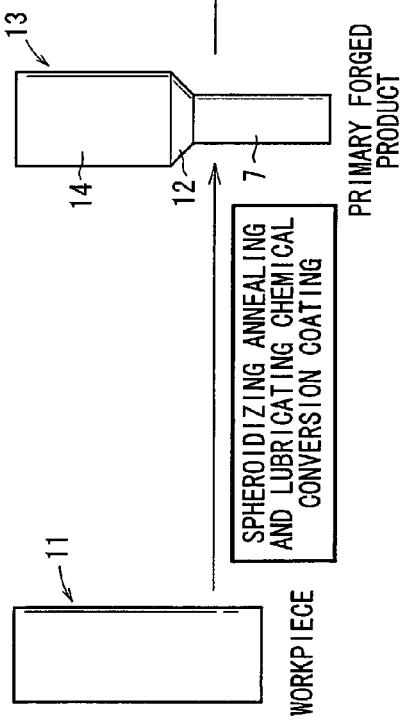
FIG. 13D SECONDARY FORGED PRODUCT
FIG. 13E TERTIARY FORGED PRODUCT
FIG. 13F FINISHED PRODUCT
LOW TEMPERATURE ANNEALING AND LUBRICATING CHEMICAL CONVERSION COATING
LOW TEMPERATURE ANNEALING AND LUBRICATING CHEMICAL CONVERSION COATING

OUTER RING MEMBER FOR CONSTANT VELOCITY JOINT AND METHOD OF MANUFACTURING THE MEMBER This application is the national phase under 35 U.S.C. §371 of PCT International Application No. PCT/JP02/06482 which has an International filing date of Jun. 27, 2002, which designated the United States of America.

TECHNICAL FIELD

The present invention relates to an outer ring member for a constant velocity joint and a method of manufacturing the member. In particular, the present invention relates to an outer ring member for a constant velocity joint which can be manufactured efficiently, and a method of manufacturing the member.

BACKGROUND ART

FIG. 10 shows a driving force transmission mechanism which is carried on an automobile or the like and which is used to transmit the driving force from an internal combustion engine to axles. In the driving force transmission mechanism, outer ring members 1, 1 for a barfield-type constant velocity joint and outer ring members 2, 2 for a tripod-type constant velocity joint are connected to one another by spline shafts 3, 3. A differential gearing 4 is interposed between the outer ring members 2, 2 for the tripod-type constant velocity joint. Both of the outer ring members 2, 2 for the tripod-type constant velocity joint are arranged near the differential gearing 4. On the other hand, the outer ring members 1, 1 for the barfield-type constant velocity joint function to transmit the rotary driving force to unillustrated wheels. In FIG. 10, reference numeral 5 indicates a half shaft for bridging the differential gearing 4 and the outer ring member 1 for the tripod-type constant velocity joint.

The end of the half shaft 5 is connected to the outer ring member 1 for the barfield-type constant velocity joint by a plurality of rollable balls 6.

FIG. 11 shows a schematic perspective view illustrating the entire outer ring member 1 for the barfield-type constant velocity joint, and FIG. 12 shows, with partial cutaway, a sectional view illustrating the outer ring member 1 for the barfield-type constant velocity joint. The outer ring member 1 for the barfield-type constant velocity joint is made of carbon steel, and it has a shaft section 7 and a cup section 8 which are integrally formed.

In particular, six ball-rolling grooves 9a to 9f are formed on the inner wall surface of the cup section 8 so that the ball-rolling grooves 9a to 9f are spaced from each other by predetermined angles in the circumferential direction (see FIG. 11). The ball-rolling grooves 9a to 9f are provided for rolling the balls 6 (see FIG. 10). The ball-rolling grooves 9a to 9f are provided to extend to the vicinity of the end of the cup section 8 along the inner wall surface of the outer ring member 1 for the barfield-type constant velocity joint (see FIGS. 11 and 12). On the other hand, a center hole 10 is provided at the end of the shaft section 7 (see FIG. 12).

The outer ring member 1 for the barfield-type constant velocity joint is manufactured by cold forging. At first, as shown in FIG. 13A, a pretreatment is applied to a workpiece 11 of a columnar material having a diameter slightly larger than that of the shaft section 7. That is, the workpiece 11 made of carbon steel is subjected to a spheroidizing annealing treatment for depositing cementite in a spherical form in a metal microstructure. Subsequently, a lubricating chemical conversion coating is formed on the surface thereof by bonderizing. In general cold forging, a coating of zinc phosphate is frequently used as the lubricating chemical conversion coating.

Subsequently, an unillustrated first forging die is used for a primary forging (forward extrusion) to the workpiece 11 on which the lubricating chemical conversion coating has been formed. That is, one end surface of the workpiece 11 is pressed against a cavity which is formed in the first forging die and which has a diameter smaller than that of the workpiece 11. Accordingly, the other end surface of the workpiece 11 is forcibly inserted into the cavity. As a result, as shown in FIG. 13B, a primary forged product 13 is obtained with the shaft section 7 and a diametrally reduced section 12 having a reduced diameter in a tapered form. The shaft section 7 and a diametrally reduced section 12 are formed by the other end of the workpiece 11.

Subsequently, a secondary forging (upsetting forming) is performed for the primary forged product 13. Specifically, an unillustrated second forging die is used to successively compress only a large diameter section 14 of the primary forged product 13 as shown in FIGS. 13C and 13D so that the large diameter section 14 is diametrally expanded to obtain a secondary forged product 15.

The secondary forged product 15 is subjected to a low temperature annealing treatment for removing any stress or the like and a shot blast treatment for removing any oxided scale or the like generated during the low temperature annealing treatment. Further, bonderizing is performed to form a lubricating chemical conversion coating of zinc phosphate or the like on the outer surface of the second forged product 15.

Subsequently, a tertiary forging process (backward extrusion) is applied to the secondary forged product 15 which is arranged in a cavity of an unillustrated third forging die after the respective treatments as described above. The diametrally expanded large diameter section 14 is elongated, ball-rolling grooves 17a to 17f are formed on the large diameter section 14, and the cup section 8 is formed.

That is, an unillustrated punch, which has a projection to form the ball-rolling grooves 17a to 17f, abuts against a central portion of one end surface of the-cup section 8. Subsequently, the end of the shaft section 7 is pressed to displace the secondary forged product 15 toward the punch. Accordingly, the secondary forged product 15 is crushed by the punch while the large diameter section 14 is surrounded by the inner wall of the cavity. Consequently, the large diameter section 14 is elongated, and the ball-rolling grooves 17a to 17f, which have shapes corresponding to the shape of the projection of the punch, are formed on the large diameter section 14. Thus, a tertiary forged product 18 is obtained as shown in FIG. 13E.

A low temperature annealing treatment is applied to the tertiary forged product 18 to soften the tertiary forged product 18. After that, a shot blast treatment is performed again, and a lubricating chemical conversion coating is formed again by the bonderizing treatment as described above. When various treatments are performed as described above, it is possible to avoid cracks which would be otherwise caused by the tensile stress on the inner surface of the cup section 8 when ironing is performed in the next step.

Finally, an unillustrated fourth forging die is used to apply the ironing (final sizing forming), i.e., a quaternary forging process for finishing the final product shape. Accordingly, the outer ring member 1 for the barfield-type constant velocity joint as the finished product is consequently obtained (see FIG. 13F).

As clearly understood from the above, in the conventional production method, it is necessary that various treatment operations, which are complicated and require a long period of time, are successively performed before forging and processing the workpiece 11, the secondary forged product 15, and the tertiary forged product 18. For this reason, the entire time required for the production is prolonged until the outer ring member 1 for the barfield-type constant velocity joint is obtained. In other words, in the conventional production method, it is impossible to efficiently manufacture the outer ring member 1 for the barfield-type constant velocity joint.

Further, it is inevitably difficult to inexpensively supply the outer ring member 1 for the barfield-type constant velocity joint under the situation since it is impossible to mass-produce the outer ring member 1 for the barfield-type constant velocity joint as described above.

An object of the present invention is to provide an outer ring member for a constant velocity joint and a method of manufacturing the member in which the outer ring member for the constant velocity joint can be efficiently manufactured by performing continuous forging machining without various treatment operations such as low temperature annealing and bonderizing treatment, and it is possible to reduce production cost.

DISCLOSURE OF THE INVENTION

According to the present invention, an outer ring member for a constant velocity joint is obtained by forming an intermediate preformed product having a cup section with an incomplete shape by pressing a diametrally expanded section of a workpiece without applying a low temperature annealing treatment and a lubricating chemical conversion coating treatment, applying a low temperature annealing treatment, a shot blast treatment, and a lubricating chemical conversion coating treatment to the intermediate preformed product, thereafter performing backward extrusion to the intermediate preformed product, and subsequently performing ironing.

In this procedure, the low temperature annealing treatment, the shot blast treatment, and the lubricating chemical conversion coating treatment are not performed between the step of the backward extrusion and the step of the ironing.

The reason why the low temperature annealing treatment, the shot blast treatment, and the formation of the lubricating chemical conversion coating based on the bonderizing treatment are unnecessary after the backward extrusion is that the ironing step is performed before causing the work hardening of the formed product which was subjected to the backward extrusion. That is, in metal material, heat is generated during plastic deformation. Therefore, the formed product has a relatively high temperature and much fluidity immediately after the backward extrusion is performed. Therefore, it is easy to plastically deform the formed product.

The formed product immediately after backward extrusion begins to cause work hardening in about 2 minutes. Therefore, it is necessary that the ironing as the next step is performed as soon as possible.

As described above, in the present invention, the ironing step is subsequently performed before the formed product obtained by the backward extrusion causes the work hardening. Therefore, it is possible to disuse the low temperature annealing treatment, the shot blast treatment, and the formation of the lubricating chemical conversion coating. That is, it is preferable that the backward extrusion step and the ironing step are performed continuously.

Further, in the present invention, it is possible to improve the stability of quality and the product accuracy of the finished product to be manufactured in the downstream steps by forming the intermediate preformed product by using a preforming die before performing the backward extrusion. In particular, it is possible to improve the accuracy of grooves formed on the inner wall surface of the cup section of the outer ring member for the constant velocity joint as the finished product.

As clearly understood from the above, the outer ring member for the constant velocity joint can be efficiently manufactured by continuously applying the ironing to the formed product immediately after the backward extrusion to the intermediate preformed product. That is, the outer ring member for the constant velocity joint can be mass-produced in a short period of time. Therefore, it is possible to supply the outer ring member for the constant velocity joint inexpensively.

It is preferable that the ironing is performed after applying a liquid lubricant to either one of or both of a surface of the formed product immediately after performing the backward extrusion step for the intermediate preformed product and a die to be used to perform the ironing, for the following reason. The procedure as described above makes it possible to avoid occurrence of galling on the formed product or the die for the ironing during the execution of the ironing for the formed product.

The low temperature annealing herein refers to the operation in which the cooling is gradually effected after heating to a temperature, for example, about 680° C. which is lower than the A1 transformation temperature (temperature at which ferrite and cementite are deposited from austenite).

BRIEF DESCRIPTION OF THE DRAWINGS

FIG. 8 is a flow chart illustrating a method of manufacturing an outer ring member for a constant velocity joint according to another embodiment;

FIGS. 9A to 9F illustrate steps of manufacturing the outer ring member for the constant velocity joint according to another embodiment respectively;

FIGS. 13A to 13F illustrate steps of conventionally forging and processing a workpiece respectively.

BEST MODE FOR CARRYING OUT THE INVENTION

Figure 1:
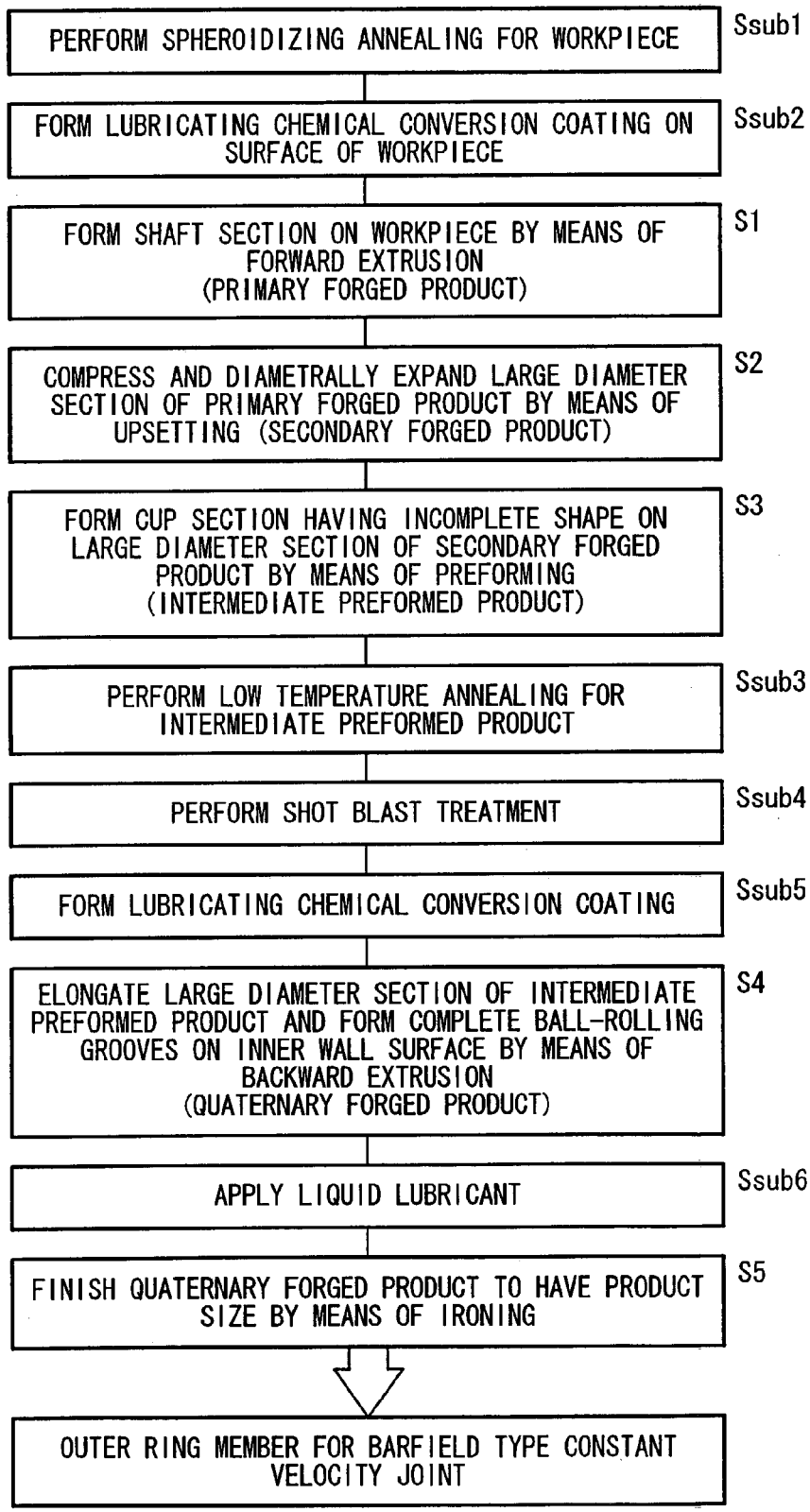
FIG. 1 is a flow chart illustrating a method of manufacturing an outer ring member for a constant velocity joint according to an embodiment of the present invention.

The outer ring member for the constant velocity joint according to the present invention will be explained in detail with reference to the accompanying drawings, as exemplified by preferred embodiments in relation to the method of manufacturing the member. The constitutive components that are same as the constitutive components shown in FIG. 10 to FIGS. 13A to 13F are designated by the same reference numerals, and detailed explanation thereof will be omitted.

In a method of manufacturing an outer ring member for a constant velocity joint according to an embodiment of the present invention, as shown in a flow chart in FIG. 1, the cold forging processes are applied five times to a workpiece 11 of a columnar material made of carbon steel, and the outer ring member 1 for the barfield-type constant velocity joint (see FIGS. 11 and 12) is finally manufactured.

Respective steps of the production method according to the embodiment of the present invention are shown in FIGS. 2A to 2G. In the conventional production method, the low temperature annealing treatment and the lubricating chemical conversion coating treatment are applied between the tertiary cold forging process and the quaternary cold forging process (see FIGS. 13E and 13F). In contrast, the production method according to the embodiment of the present invention differs in that these treatments are omitted between the quaternary cold forging process and the quinary cold forging process (see FIGS. 2F and 2G). In other words, in the production method according to the embodiment of the present invention, the quinary cold forging process is continuously applied to the quaternary forged product 24 to which the quaternary cold forging process has been applied, without performing various treatments including the low temperature annealing treatment and the lubricating chemical conversion coating treatment.

Figure 2:
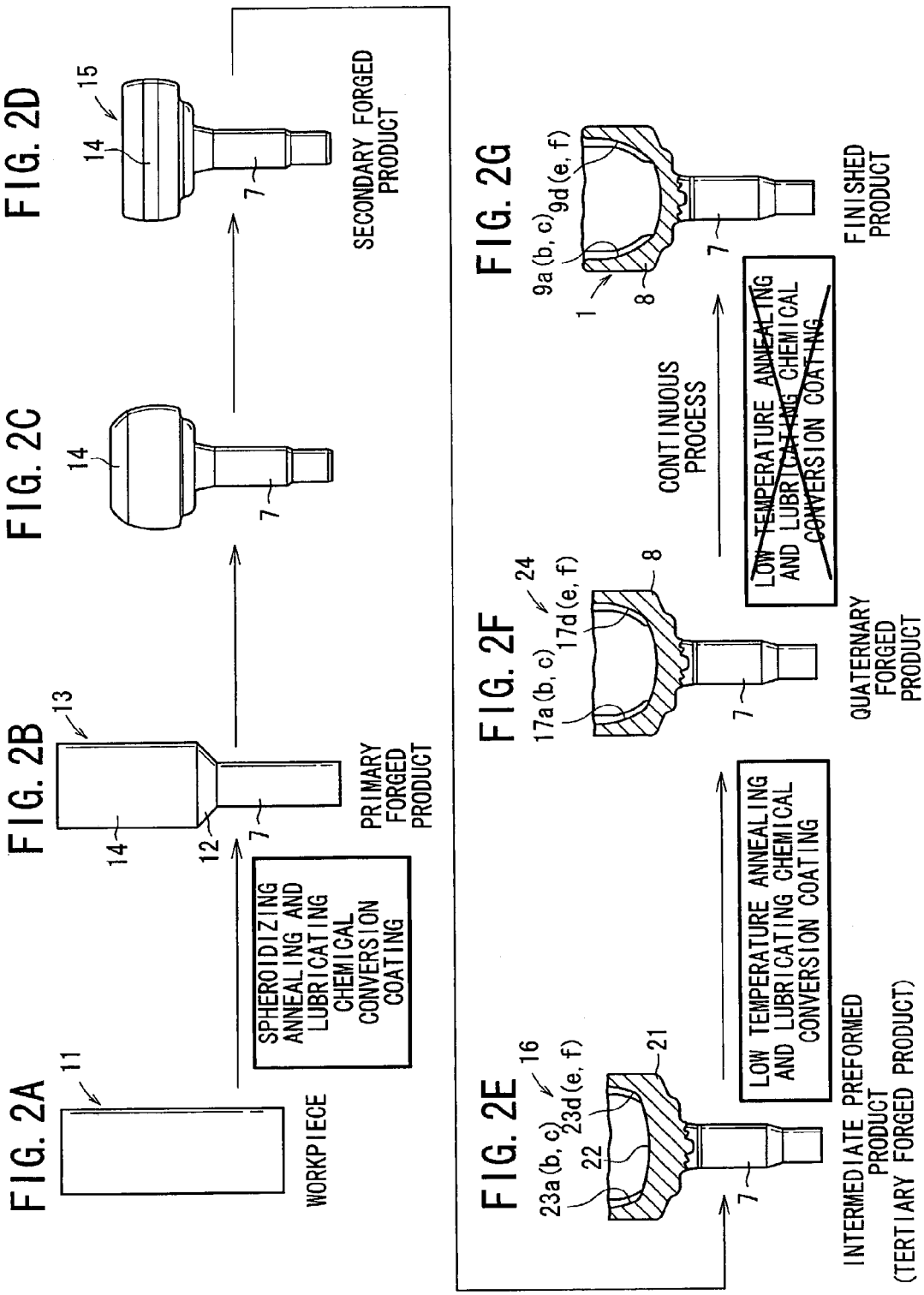
FIGS. 2A to 2G illustrate steps of manufacturing the outer ring member for the constant velocity joint according to the embodiment of the present invention respectively.

Further, the embodiment of the present invention differs from the conventional production method in that the intermediate preformed product 16 as a tertiary forged product is formed between the secondary forged product 15 and the quaternary forged product 24 (see FIG. 2E).

At first, in a first preparatory step Ssub1, a spheroidizing annealing treatment is applied to a workpiece 11 (see FIG. 2A) cut into a columnar material having a predetermined length. Accordingly, the workpiece 11 is softened, and it is easy to perform the primary to quinary cold forging processes to be performed thereafter.

In a second preparatory step Ssub2, a lubricating chemical conversion coating is formed on the workpiece 11. That is, the lubricating chemical conversion coating of zinc phosphate or the like is formed on the surface of the workpiece 11 by a bonderizing treatment to give the lubricating property to the surface. Specifically, the lubricating chemical conversion coating may be formed by immersing the workpiece 11 in a solvent dissolved with zinc phosphate or the like as described above for a predetermined period of time.

Subsequently, in a primary cold forging process step S1, the forward extrusion is applied to the workpiece 11 on which the lubricating chemical conversion coating has been formed. That is, the workpiece 11 is charged into a workpiece holder of a first forging die having an unillustrated cavity for forming the shaft section. The cavity for forming the shaft section has a diameter which is smaller than that of the workpiece 11. Further, a tapered surface is provided between the workpiece holder and the cavity for forming the shaft section.

Starting from this state, one end surface of the workpiece 11 is pressed toward the cavity for forming the shaft section. In accordance with this pressing operation, the other end surface portion of the workpiece 11 is forcibly inserted into the cavity for forming the shaft section. As a result, a primary forged product 13 (see FIG. 2B) is obtained, which is formed with a shaft section 7 and a diametrally reduced section 12 having a reduced diameter in a tapered form on the side of the other end surface. The portion of the workpiece 11, which is charged into the workpiece holder, scarcely undergoes plastic deformation. Therefore, the primary forged product 13 has a large diameter section 14 with its diameter being a size corresponding to the diameter of the workpiece 11.

Subsequently, in a secondary cold forging process step S2, the upsetting is performed for the primary forged product 13. That is, the primary forged product 13 is charged into a cavity of an unillustrated second forging die. During this process, the shaft section 7 is inserted into a shaft section holder provided for the second forging die.

The large diameter section 14 of the primary forged product 13 is pressed and crushed with a punch while the end of the shaft section 7 inserted into the shaft section holder is supported with a holding stopper member. The large diameter section 14 is compressed and subjected to the expansion of the diameter thereof in accordance with the crushing. Thus, a secondary forged product 15 (see FIG. 2D) is obtained.

Subsequently, in a tertiary cold forging process step S3, the forward extrusion is applied to the large diameter section 14 of the secondary forged product 15 as preforming to form an intermediate preformed product 16 as a tertiary forged product (see FIG. 2E).

Figure 3:
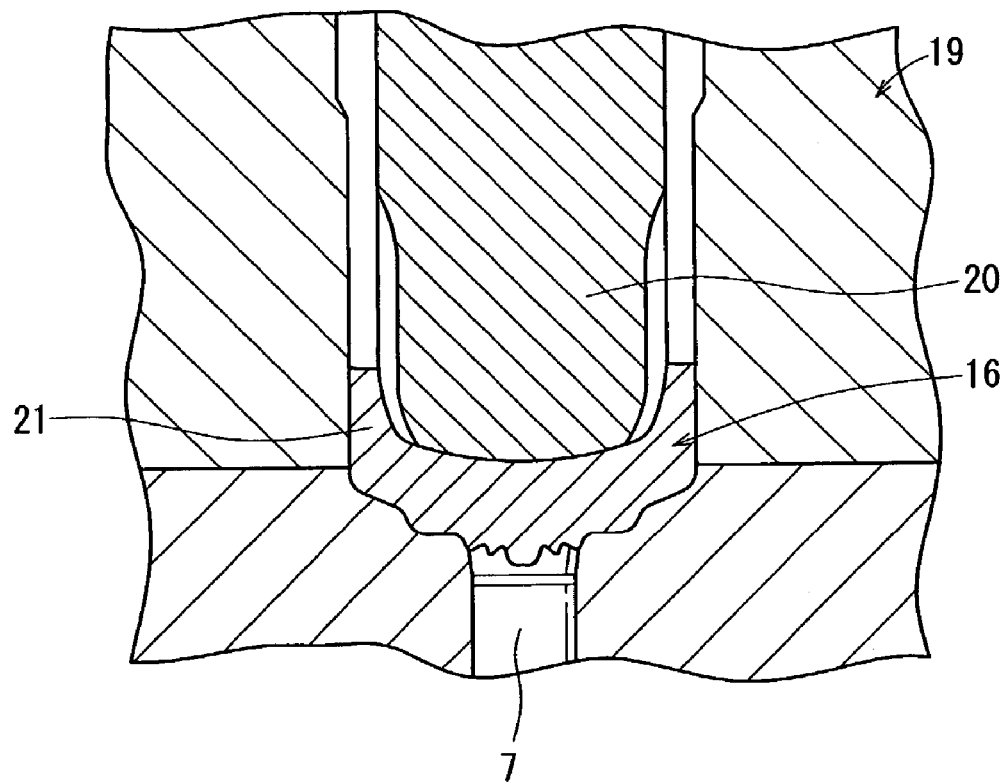
FIG. 3 is, with partial omission, a vertical sectional view illustrating a state in which an intermediate preformed product is formed by a die apparatus for tertiary forging (die apparatus for preforming)

That is, as shown in FIG. 3, a third forging die (preforming die) 19 is used to press with a punch 20 the large diameter section 14 of the secondary forged product 15 charged into a cavity so that the large diameter section 14 is plastically deformed to form the intermediate preformed product 16 (tertiary forged product) having a cup section 21 with an incomplete shape as compared with the cup section 8 of the finished product.

As shown in FIG. 2E, the cup section 21 having the incomplete shape as described above is provided with a recess 22 which is relatively shallow and which has a circular arc-shaped cross section formed by being pressed by the end of the punch 20, and ball-rolling grooves 23a to 23f which are formed on the inner wall surface of the recess 22 and which have incomplete shapes as compared with the ball-rolling grooves 9a to 9f formed on the finished product.

The bottom portion of the cup section 21 having the incomplete shape is relatively thick-walled as compared with the finished product as described later on, and is connected to the shaft section 7 of the intermediate preformed product 16. The dimension of the cup section 21 from the top to the bottom surface is smaller than the dimension of the cup section 8 of the finished product.

In this procedure, the intermediate preformed product 16 (tertiary forged product) is formed by using the preforming die, and thus it is possible to improve the stability of quality and the product accuracy of the finished product formed in the downstream steps.

The low temperature annealing for removing stress from the intermediate preformed product 16, the shot blast treatment for removing oxidized scale or the like generated during the low temperature annealing, and the formation of the lubricating chemical conversion coating of zinc phosphate or the like on the outer surface of the intermediate preformed product 16 by the bonderizing treatment are performed in third to fifth preparatory steps Ssub3, Ssub4, and Ssub5 respectively after completing the tertiary cold forging process step S3. When the various treatments as described above are performed, it is easy to plastically deform the intermediate preformed product 16 (tertiary forged product).

Figure 4:
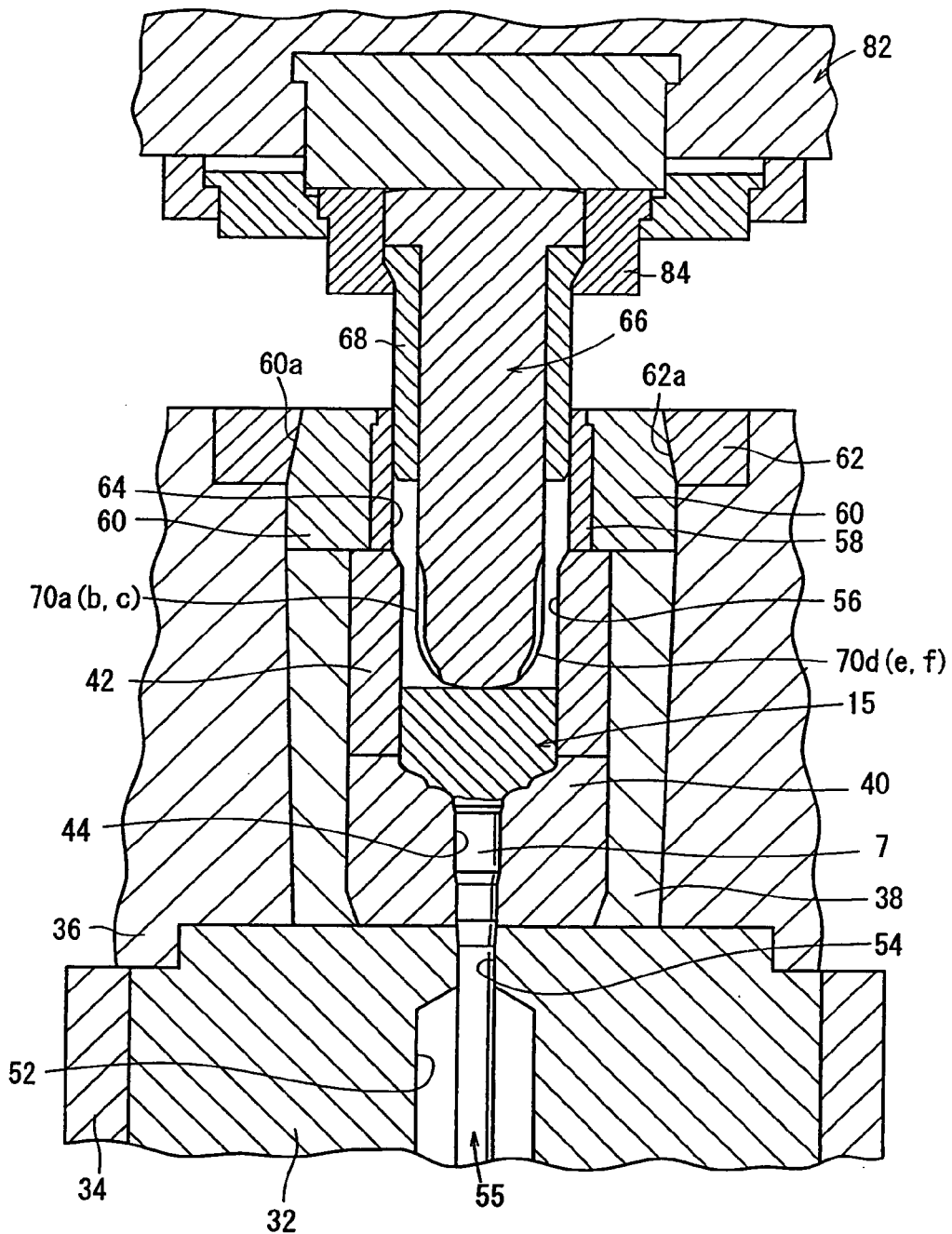
FIG. 4 is a schematic vertical sectional view illustrating a forging die apparatus for executing a quaternary cold forging process step of the method of manufacturing the outer ring member for the constant velocity joint according to the embodiment of the present invention.

After that, a forging die apparatus (fourth forging die) 30 shown in FIG. 4 is used to perform a quaternary cold forging process step S4.

The structure of the forging die apparatus 30 will now be schematically explained.

The forging die apparatus 30 has a first die plate 32 and a second die plate 34. A forcible insertion ring 36, which is thick-walled, is fixed on the first die plate 32 by an unillustrated fixing member.

An insert member 38 has a cylindrical shape, and is internally fitted to a hole of the forcible insertion ring 36. The outer diameter of the insert member 38 is slightly larger than the inner diameter of the forcible insertion ring 36. That is, the insert member 38 is fitted into the hole of the forcible insertion ring 36 by interference fit.

Further, a lower die 40 has a short size in the axial direction as compared with the insert member 38, and is arranged in the insert member 38. An upper die 42 is joined onto the lower die 40 so that the upper end thereof is flush with the upper end of the insert member 38. In particular, a shaft insert section 44 is provided in the lower die 40 in order to insert the shaft section 7 of the intermediate preformed product 16 (tertiary forged product).

A through-hole 54 is provided at a position disposed vertically downwardly from the shaft insert section 44, and is communicated with a hole 52 formed in the first die plate 32. A knockout pin 55 is arranged in the through-hole 54, and is movable upwardly or downwardly therein.

Figure 11:
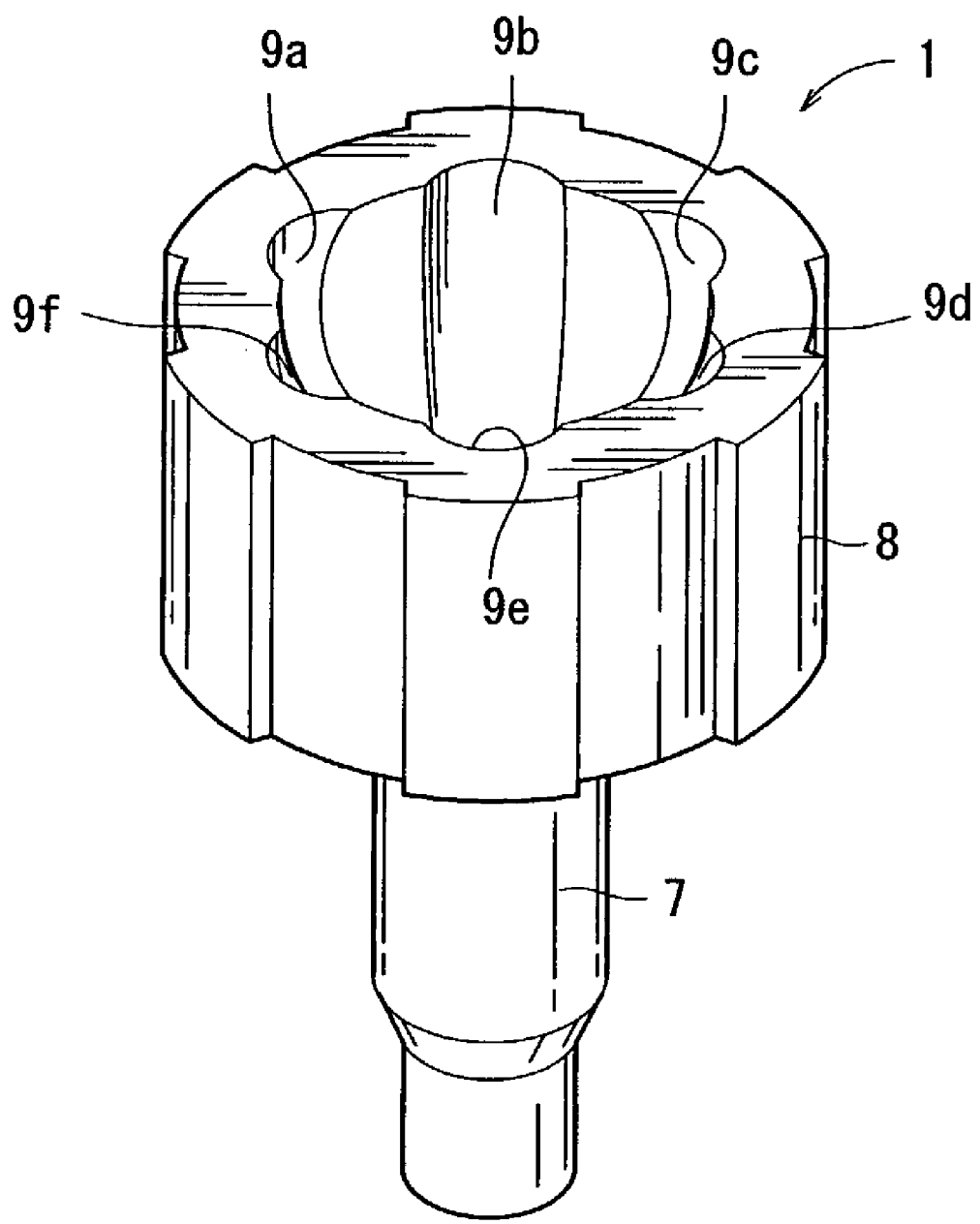
FIG. 11 is a schematic perspective view illustrating the entire outer ring member for the barfield-type constant velocity joint.
Figure 12:
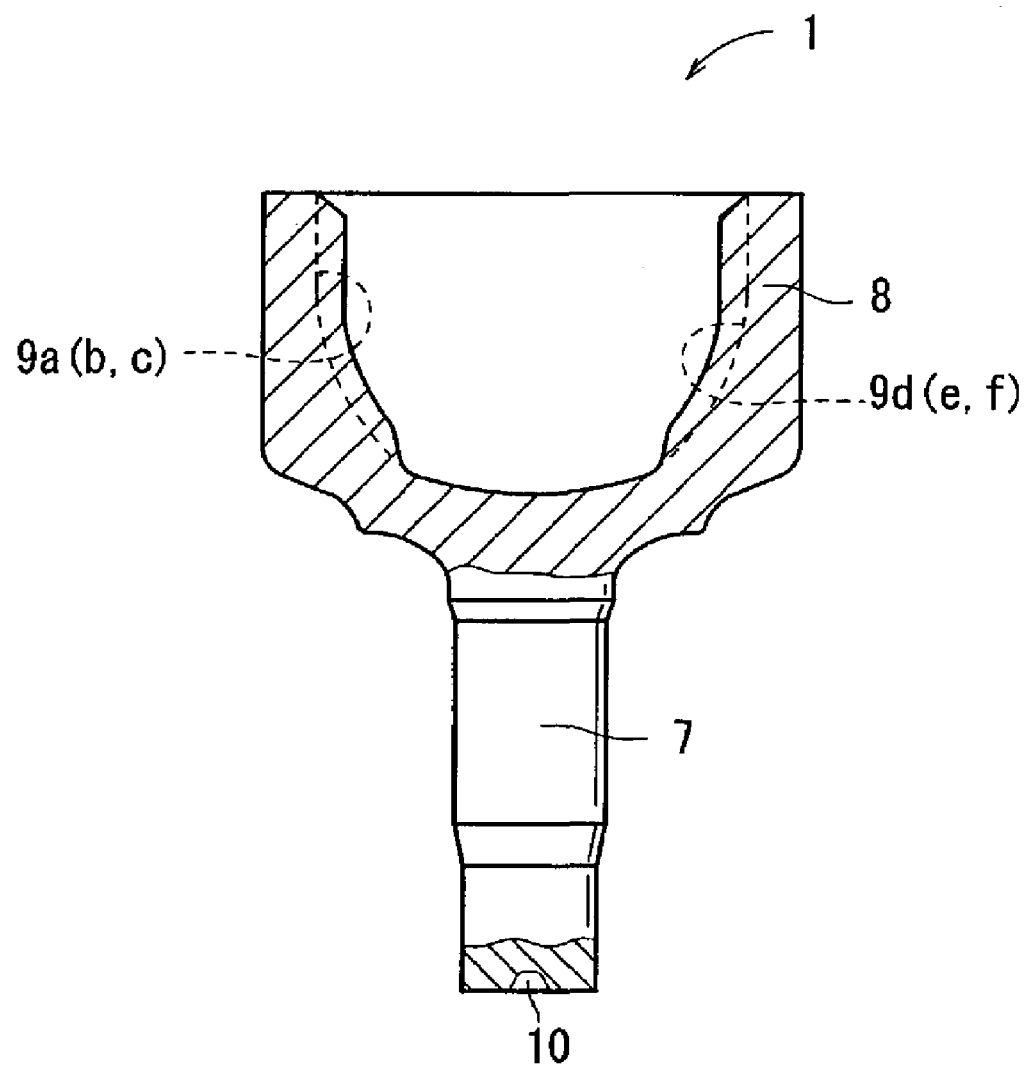
FIG. 12 is, with partial cutaway, a sectional view illustrating the outer ring member for the barfield-type constant velocity joint shown in FIG. 8.

On the other hand, the upper die 42 is provided with a cup section-forming cavity 56 in order that the cup section 21 of the intermediate preformed product 16 (tertiary forged product) having the incomplete shape is formed into the cup section 8 having the complete shape (see FIG. 11). It is a matter of course that the diameter of the cup section-forming cavity 56 is set to be larger than that of the shaft insert section 44.

A first ring member 58 is joined to the upper end surface of the upper die 42. Further, a second ring member 60 is joined to the upper end surface of the insert member 38, and is externally fitted to the first ring member 58. Further, a third ring member 62 is joined to an annular recess provided on the forcible insertion ring 36, and is externally fitted to the second ring member 60.

In this arrangement, when the third ring member 62 is fastened to the forcible insertion ring 36 so that the second ring member 60 is externally fitted, a tapered surface 62a formed on the third ring member 62 makes sliding contact with a reverse tapered surface 60a formed on the second ring member 60. As a result, the force is exerted to press the first ring member 58 and the second ring member 60 in the downward direction.

On the other hand, a hole 64 is formed in the first ring member 58. A punch 66 is inserted into the hole 64. A guide sleeve 68 of a cylindrical member made of metal is externally fitted to the side circumferential wall of the punch 66 in order that the punch 66 is smoothly operated and moved upwardly or downwardly. Therefore, the guide sleeve 68 is interposed between the first ring member 58 and the punch 66.

Figure 5:
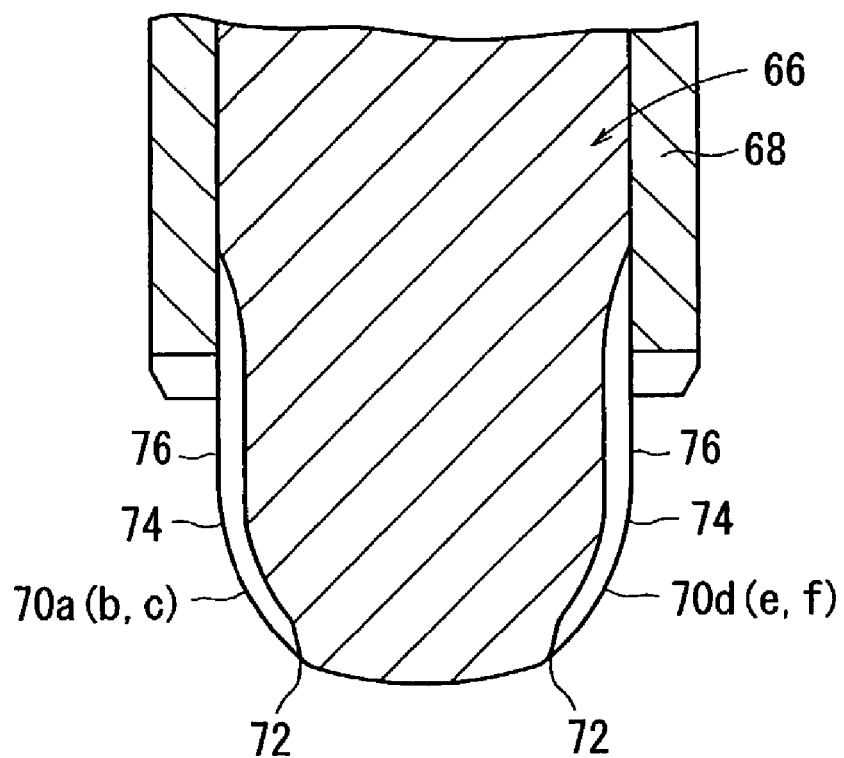
FIG. 5 is, with partial omission, a vertical sectional view illustrating a punch of the forging die apparatus shown in FIG. 4.
Figure 6:
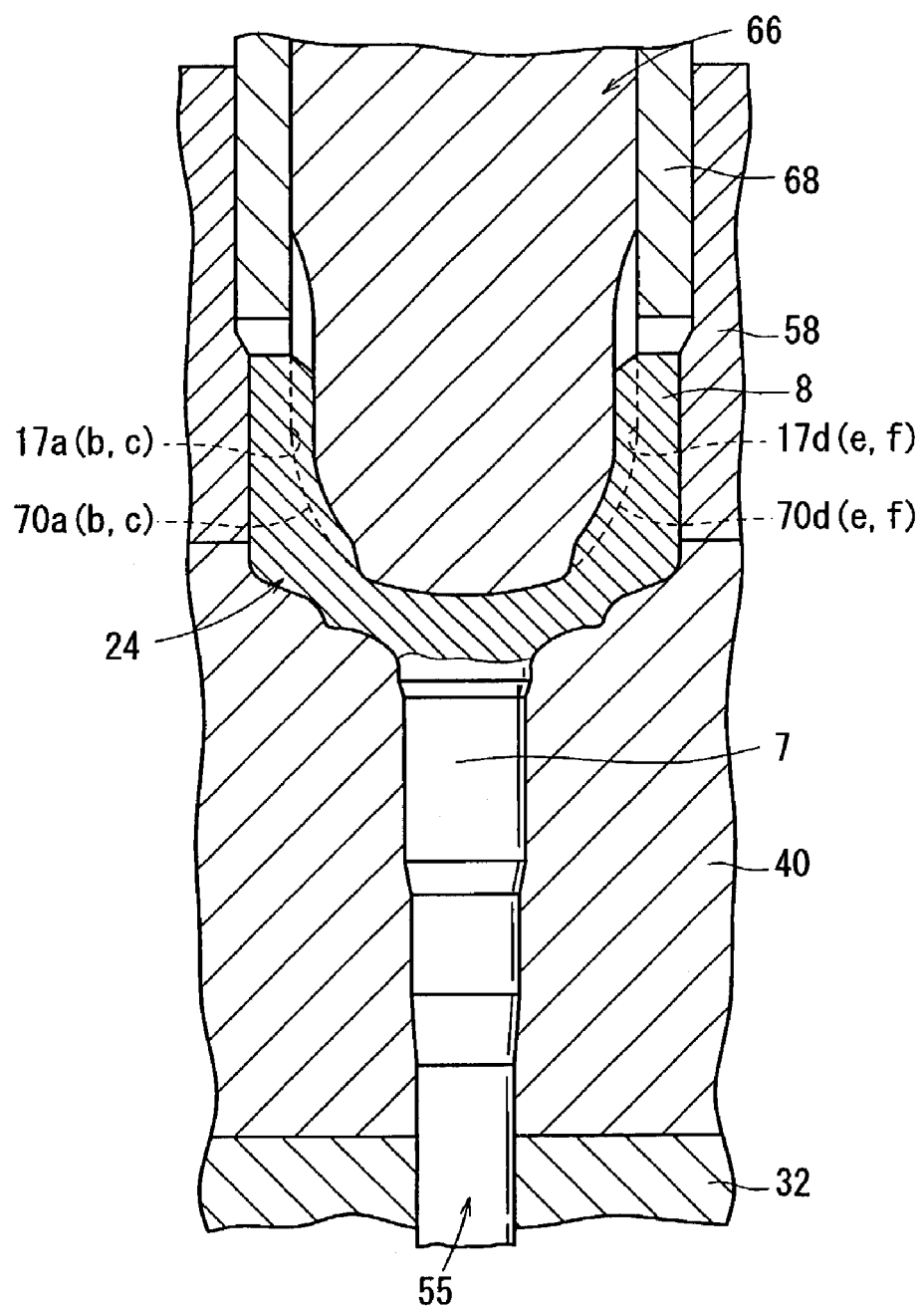
FIG. 6 is a magnified vertical sectional view of major parts, in which a punch is moved downwardly to form a quaternary forged product.

In this arrangement, as shown in FIG. 5, six striped ridges 70a to 70f, which are spaced from each other by 60° in the circumferential direction and which extend by predetermined lengths in the axial direction of the punch 66, are provided on the outer circumference of the end of the punch 66. Each of the striped ridges 70a to 70f has a first straight portion-forming region 72, a circular arc-shaped portion-forming region 74, and a second straight portion-forming region 76 in this order from the end of the punch 66. As shown in FIG. 6, the ball-rolling grooves 17a to 17f having the complete shapes are formed on the cup section 8 of the quaternary forged product 24 by the striped ridges 70a to 70f. The ironing is performed for the cup section 8, especially for the ball-rolling grooves 17a to 17f in a quinary cold forging process step S5 as described later on. Thus, the ball-rolling grooves 9a to 9f (see FIGS. 11 and 12) are formed, in which the shape and size accuracies are further improved.

The punch 66 is movable upwardly or downwardly by an unillustrated machine press. That is, a ram (not shown) of the machine press is connected with a vertically movable member 82 which is displaceable in the upward or downward direction together with the ram (see FIG. 4). The punch 66 is fixed to the vertically movable member 82 by a jig 84.

The quaternary cold forging process, i.e., the backward extrusion is performed as follows for the intermediate preformed product 16 (tertiary forged product) with the shaft section 7 inserted into the shaft insert section 44 of the forging die apparatus 30 constructed as described above. The end surface of the shaft section 7 abuts against the end surface of the knockout pin 55 when inserted into the shaft insert section 44.

At first, the vertically movable member 82 connected to the ram of the machine press is moved downwardly by the machine press. The punch 66 is moved downwardly to follow this operation, and the punch 66 finally abuts against the recess 22 of the cup section 21 of the intermediate preformed product 16 (tertiary forged product).

When the punch 66 is further moved downwardly, the ball-rolling grooves 17a to 17f, which are directed in the axial direction of the intermediate preformed product 16 (tertiary forged product), are formed on the inner wall surface of the cup section 8 by the striped ridges 70a to 70f of the punch 66. That is, the ball-rolling grooves 17a to 17f having the complete shapes, which include straight portions, circular arc-shaped portions, and straight portions corresponding to the first straight portion-forming regions 72, the circular arc-shaped portion-forming regions 74, and the second straight portion-forming regions 76 of the striped ridges 70a to 70f, are provided on the cup section 8.

Simultaneously, as shown in FIG. 6, one end surface of the cup section 21 having the incomplete shape, which is crushed by the punch 66, enters the space between the side circumferential wall of the punch 66 and the cup section-forming cavity 56, while being elongated in accordance with the plastic flow. Accordingly, the cup section 8, which has the complete shape and which is relatively thick-walled and long, is formed.

It goes without saying that the load is applied so that the knockout pin 55 is not moved downwardly during this process. That is, the intermediate preformed product 16 (tertiary forged product) is not displaced during the formation of the cup section 8 and the ball-rolling grooves 17a to 17f.

After that, the punch 66 is moved upwardly together with the ram and the vertically movable member 82 by the machine press so that the punch 66 is disengaged from the first ring member 58, and the knockout pin 55 is moved upwardly. Accordingly, the quaternary forged product 24 (see FIG. 2F) is exposed.

Metal material ordinarily has a property that heat is generated during the plastic flow. Therefore, the quaternary forged product 24 has a relatively high temperature immediately after the plastic deformation. If the quaternary forged product 24 is left and cooled in this state, then the work hardening is caused, and the hardness and the strength are increased. That is, it is difficult to effect the plastic deformation again.

Accordingly, in the embodiment of the present invention, the quinary cold forging process is continuously applied to the quaternary forged product 24 having the relatively high temperature immediately after performing the quaternary cold forging process step S4. In this procedure, the quaternary forged product 24 can be plastically deformed with ease, because the operation is performed before the quaternary forged product 24 causes the work hardening.

Further, it is unnecessary to perform the low temperature annealing for softening the quaternary forged product 24, because it is easy to effect the plastic deformation. Therefore, no oxided scale appears, and hence it is also unnecessary to perform the shot blast treatment. Further, the material which causes the plastic deformation with ease, in other words, the material which plastically flows with ease makes lubrication relatively satisfactorily with respect to a forging die. Therefore, it is also unnecessary to form the lubricating chemical conversion coating.

That is, when the quinary cold forging process step S5 is subsequently or continuously performed immediately after the quaternary cold forging process step S4, it is unnecessary to perform the low temperature annealing treatment, the shot blast treatment, and the formation of the lubricating chemical conversion coating based on the bonderizing treatment which were performed between the tertiary forging process and the quaternary forging process in the conventional production method. Accordingly, it is possible to efficiently manufacture the outer ring member 1 for the barfield-type constant velocity joint. In other words, the outer ring member 1 for the barfield-type constant velocity joint can be mass-produced in a short period of time. Therefore, it is possible to supply the outer ring member 1 for the barfield-type constant velocity joint inexpensively.

As shown in FIG. 1, before the quinary cold forging process step S5, a liquid lubricant is applied to at least one of the surface of the quaternary forged product 24 and a fifth forging die (not shown) in a sixth preparatory step Ssub6. Accordingly, it is possible to avoid the occurrence of galling on the quaternary forged product 24 or the fifth forging die during the execution of the quinary cold forging process step S5. A liquid lubricant which is commonly known may be used as the liquid lubricant.

In the quinary cold forging process step S5, the unillustrated fifth forging die is used to apply the ironing (final sizing forming) to the quaternary forged product 24 in order that the cup section 8 is finished to have the final product shape. That is, the cup section 8 is processed so that the wall thickness of the cup section 8 and the depths of the ball-rolling grooves 17a to 17f have predetermined sizes. Accordingly, the outer ring member 1 (see FIGS. 2G, 11, and 12) for the barfield-type constant velocity joint is consequently obtained as the finished product which is provided with the size accuracy of the cup section 8 including the shapes of, for example, the ball-rolling grooves 9a to 9f. Simultaneously, the center hole 10 (see FIG. 12) is formed in the shaft section 7 by a projection (not shown) provided at the end of a knockout pin (not shown) of the fifth forging die.

The plastic deformation of the quaternary forged product 24 is extremely minute in the step S5. Therefore, even when the step S5 is performed without applying the low temperature annealing treatment, the shot blast treatment, and the lubricating chemical conversion coating treatment, the inner surface of the cup section 8 is prevented from the occurrence of cracks which would be otherwise caused by the action of the tensile stress during the forging process.

According to the production method concerning the embodiment of the present invention, the intermediate preformed product 16 is formed as the tertiary forged product before executing the quaternary cold forging process step S4. Thus, it is possible to improve the stability of quality and the accuracy of the finished product.

In other words, even if the shape of the cup section 21 is incomplete in the intermediate preformed product 16, when the cup shape is formed to have the curved recess 22 and the partial ball-rolling grooves 23a to 23f, then the ball-rolling grooves 17a to 17f can be formed easily and accurately on the inner wall surface of the cup section 8 in the quaternary cold forging process step, and it is possible to further improve the formability of the ball-rolling grooves 17a to 17f.

Further, according to the production method concerning the embodiment of the present invention, the quinary cold forging process step S5 can be performed without performing the low temperature annealing treatment, the shot blast treatment, and the formation of the lubricating chemical conversion coating based on the bonderizing treatment after the quaternary cold forging process step S4. Accordingly, it is possible to efficiently manufacture the outer ring member 1 for the barfield-type constant velocity joint. Therefore, it is possible to provide the outer ring member 1 for the barfield-type constant velocity joint inexpensively.

Further, according to the production method concerning the embodiment of the present invention, the low temperature annealing treatment and the lubricating chemical conversion coating treatment are applied only once after the formation of the intermediate preformed product 16. Accordingly, it is possible to continuously perform the backward extrusion as the quaternary cold forging process step S4 and the ironing as the quinary cold forging process step S5.

Further, according to the production method concerning the embodiment of the present invention, it is unnecessary to perform various complicated and troublesome treatments such as the low temperature annealing treatment, the shot blast treatment, and the bonderizing treatment that were performed conventionally between the quaternary cold forging process step S4 for performing the backward extrusion and the quinary cold forging process step S5 for performing the ironing. Thus, it is possible to reduce the labor of the operator and various costs.

That is, the operation is extremely laborious for the operator such that a plurality of formed products of outer ring members for constant velocity joints of heavy materials are imported into an unillustrated annealing furnace or the like to perform the low temperature annealing treatment, the formed products are thereafter exported from the unillustrated annealing furnace, the formed products are transported to an unillustrated shot blast apparatus to perform the shot blast treatment, and an unillustrated bonderizing lubrication treatment apparatus is used to successively perform the bonderizing treatment. Further, the operation as described above requires various costs such as supplies for treatment materials and expenses for operating the equipment required for the various treatments. Further, the labor load is heavily burdened in the transport operation or the like, because the workpiece is heavy in weight.

Figure 7:
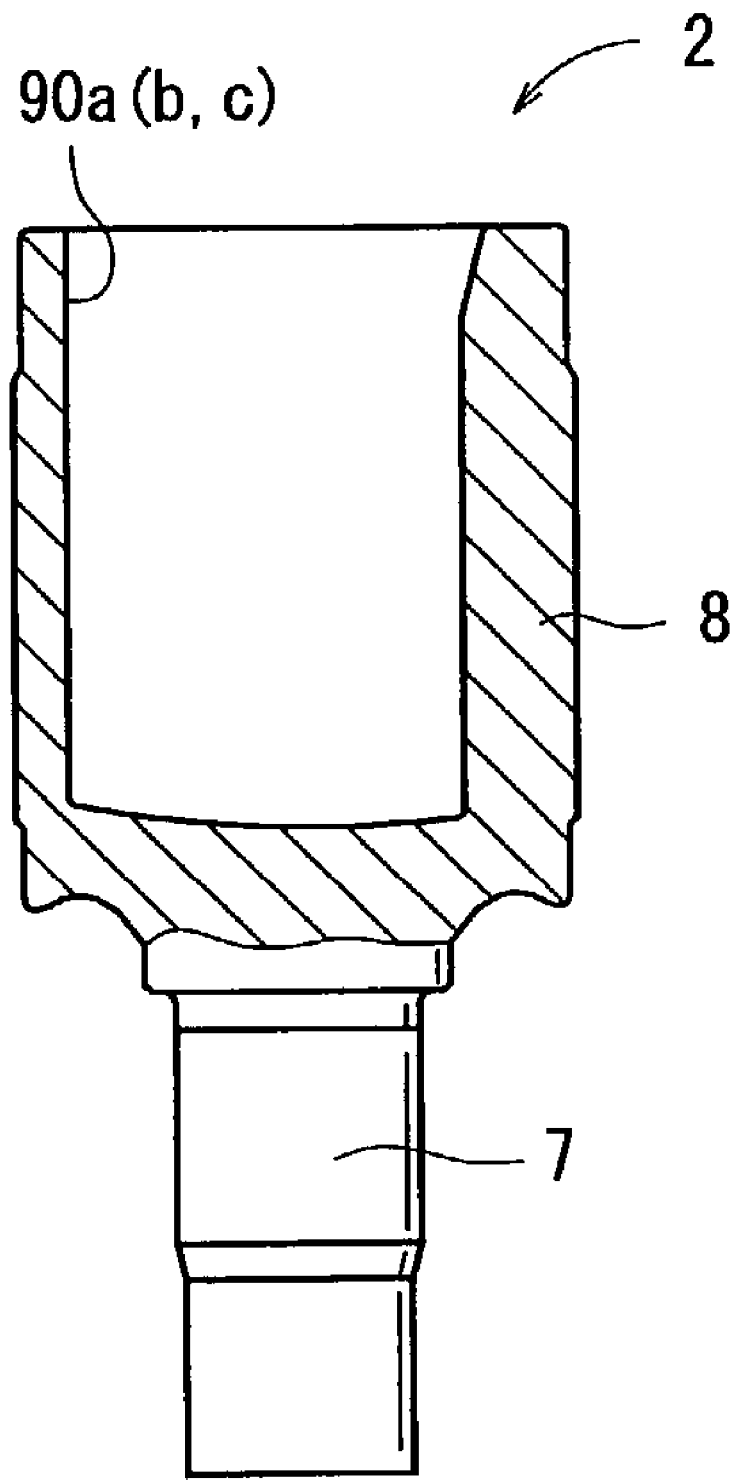
FIG. 7 is, with partial cutaway, a sectional view illustrating an outer ring member for a tripod-type constant velocity joint.
Figure 10:
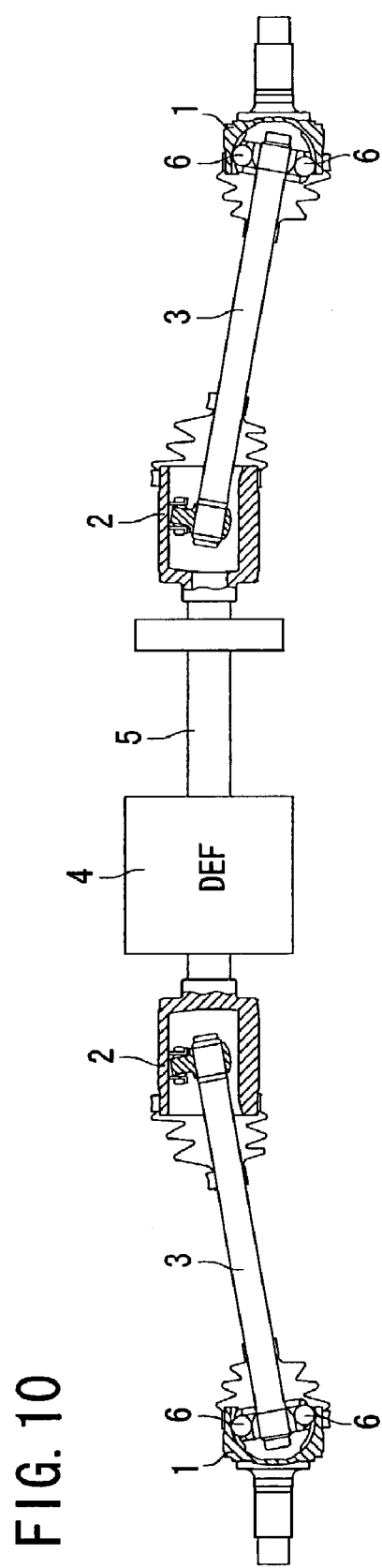
FIG. 10 shows a schematic arrangement of a driving force transmission mechanism comprising four outer ring members for constant velocity joints which are connected to spline shafts.

The embodiment described above is illustrative of the case in which the outer ring member 1 for the barfield-type constant velocity joint is manufactured. However, there is no special limitation thereto. It is also possible to manufacture an outer ring member 2 for a tripod-type constant velocity joint having three track grooves 90a to 90c formed in a cup section 8 as shown in FIG. 7.

Next, a production method according to another embodiment is shown in FIGS. 8 and 9.

The production method according to another embodiment shown in a flow chart in FIG. 8 differs in that the step of forming the intermediate preformed product 16 (see the step S3 in FIG. 3) is omitted from the production method according to the embodiment described above shown in the flow chart in FIG. 1. All of the other steps are identical.

That is, the production method according to another embodiment is characterized in that the tertiary cold forging process step (see the step S13 in FIG. 8) is performed by using the forging die apparatus 30 shown in FIG. 4 without forming the intermediate preformed product 16 as the tertiary forged product, and the quaternary cold forging process step (see the step S14 in FIG. 8) including the ironing is performed continuously to the tertiary cold forging process step without applying the low temperature annealing treatment and the lubricating chemical conversion coating treatment respectively.

As a result, the production steps are further simplified in the production method according to another embodiment, and thus it is possible to shorten the production time and reduce the production cost. The other function and effect are the same as those of the production method according to the embodiment described above, and hence any detailed explanation thereof is omitted.

INDUSTRIAL APPLICABILITY

As described above, according to the present invention, the diametrally expanded section of the workpiece is pressed to form the intermediate preformed product having the cup section with the incomplete shape without applying the low temperature annealing treatment and the lubricating chemical conversion coating treatment. The low temperature annealing treatment, the shot blast treatment, and the lubricating chemical conversion coating treatment are applied to the intermediate preformed product. After that, the backward extrusion is performed for the intermediate preformed product, and the ironing is performed subsequently. Thus, it is possible to omit the low temperature annealing treatment, the shot blast treatment, and the lubricating chemical conversion coating treatment between the backward extrusion step and the ironing step.

That is, the ironing is continuously applied before causing the work hardening after the backward extrusion to the intermediate preformed product. Accordingly, it is unnecessary to perform the low temperature annealing treatment, the shot blast treatment, and the formation of the lubricating chemical conversion coating between the backward extrusion step and the ironing step. Therefore, it is possible to efficiently manufacture the outer ring member for the constant velocity joint, and it is possible to reduce the production cost.

Further, according to the present invention, the intermediate preformed product is formed before performing the backward extrusion. Accordingly, it is possible to improve the stability of quality and the product accuracy of the finished product.

The invention claimed is:

1. A method of manufacturing an outer ring member for a constant velocity joint having a shaft section and a cup section integrally, said method comprising the steps of:
    forming said shaft section by forward extrusion to a workpiece having a surface with a lubricating chemical conversion coating;
    forming a diametrally expanded section by upsetting a portion of said workpiece except for said shaft section, and then forming an intermediate preformed product having a cup section with an incomplete shape by pressing said diametrally expanded section without a low temperature annealing treatment, a shot blast treatment and a lubricating chemical conversion coating treatment;
    applying a low temperature annealing treatment, a shot blast treatment and a lubricating chemical conversion coating treatment to said intermediate preformed product and thereafter forming a formed product having said cup section provided with grooves by backward extrusion to said intermediate preformed product; and
    subsequently ironing said formed product before work hardening in said formed product without applying a low temperature annealing treatment, a shot blast treatment and a lubricating chemical conversion coating treatment to said formed product.

2. The method of manufacturing said outer ring member for said constant velocity joint according to claim 1, wherein a liquid lubricant is applied to any one of or both of a surface of said formed product and a die into which said formed product is charged, before said ironing.

* * * * *